United States Patent
Huang et al.

(10) Patent No.: US 11,397,852 B2
(45) Date of Patent: Jul. 26, 2022

(54) NEWS INTERACTION METHOD, APPARATUS, DEVICE AND COMPUTER STORAGE MEDIUM

(71) Applicant: BEIJING BAIDU NETCOM SCIENCE AND TECHNOLOGY CO., LTD, Beijing (CN)

(72) Inventors: Shuo Huang, Beijing (CN); Jiaxin Lin, Beijing (CN); Zhihong Fu, Beijing (CN); Jinbo Zhan, Beijing (CN); Guang Ling, Beijing (CN); Shiwei Huang, Beijing (CN); Guyue Zhou, Beijing (CN); Chao Zhou, Beijing (CN)

(73) Assignee: BEIJING BAIDU NETCOM SCIENCE AND TECHNOLOGY CO., LTD, Beijing (CN)

( * ) Notice: Subject to any disclaimer, the term of this patent is extended or adjusted under 35 U.S.C. 154(b) by 276 days.

(21) Appl. No.: 16/713,058

(22) Filed: Dec. 13, 2019

(65) Prior Publication Data
US 2020/0193089 A1   Jun. 18, 2020

(30) Foreign Application Priority Data
Dec. 17, 2018   (CN) .......................... 201811541693.X

(51) Int. Cl.
*G06F 40/205*   (2020.01)
*G10L 15/04*   (2013.01)
*G06F 40/30*   (2020.01)

(52) U.S. Cl.
CPC ............ *G06F 40/205* (2020.01); *G06F 40/30* (2020.01); *G10L 15/04* (2013.01)

(58) Field of Classification Search
None
See application file for complete search history.

(56) References Cited

U.S. PATENT DOCUMENTS

| 9,338,493 | B2 * | 5/2016 | Van Os ................... G06F 3/167 |
| 10,896,295 | B1 * | 1/2021 | Shenoy ............... G10L 15/1815 |
| 10,922,355 | B2 * | 2/2021 | Tian ...................... G06F 16/335 |
| 11,100,179 | B1 * | 8/2021 | Zhou ................... G06F 16/3344 |
| 11,151,177 | B2 * | 10/2021 | Li .......................... G06F 16/951 |

(Continued)

FOREIGN PATENT DOCUMENTS

| CN | 107220380 | A | * | 9/2017 | ........... G06F 40/247 |
| CN | 108345640 | A | * | 7/2018 | |

(Continued)

*Primary Examiner* — Andrew C Flanders
*Assistant Examiner* — Jonathan Ernesto Amaya Hernandez
(74) *Attorney, Agent, or Firm* — Lando & Anastasi, LLP

(57) ABSTRACT

A news interaction method, apparatus, device and computer storage medium are proposed. Input information input by a user upon reading current news content is obtained; parsing information of the input information is obtained based on the current news content, where the parsing information includes intent information of the input information; the input information is distributed to at least one news interactive service subsystem according to the intent information of the input information, and a return result returned by the at least one news interactive service subsystem is received; and a display result is selected from the return result according to a preset policy, and provided to the user.

17 Claims, 4 Drawing Sheets

(56) References Cited

U.S. PATENT DOCUMENTS

| | | | |
|---|---|---|---|
| 2015/0271557 A1* | 9/2015 | Tabe | H04N 21/6125 |
| | | | 725/62 |
| 2017/0300823 A1* | 10/2017 | Bostick | H04L 67/306 |
| 2017/0308583 A1* | 10/2017 | Husain | G06F 16/9024 |
| 2018/0046702 A1* | 2/2018 | Jung | G06F 16/9535 |
| 2018/0336275 A1* | 11/2018 | Graham | G06F 9/453 |
| 2018/0349472 A1* | 12/2018 | Kohlschuetter | G06F 16/3322 |
| 2018/0357225 A1* | 12/2018 | Liu | G06F 40/56 |
| 2020/0036659 A1* | 1/2020 | Wu | G06F 40/30 |
| 2020/0134449 A1* | 4/2020 | Perez | G06F 16/24522 |

FOREIGN PATENT DOCUMENTS

| | | | | |
|---|---|---|---|---|
| WO | WO-2009029903 A2 * | 3/2009 | | G06F 16/3344 |
| WO | WO-2017041370 A1 * | 3/2017 | | G06F 16/00 |

\* cited by examiner

NEWS INTERACTION METHOD, APPARATUS, DEVICE AND COMPUTER STORAGE MEDIUM

CROSS REFERENCE TO RELATED APPLICATIONS

The present application claims the priority of Chinese Patent Application No. 201811541693.X, filed on Dec. 17, 2018, with the title of "News interaction method, apparatus, device and computer storage medium". The disclosure of the above application is incorporated herein by reference in its entirety.

FIELD

The present disclosure relates to the field of the Internet technologies, and particularly to a news interaction method, apparatus, device and computer storage medium.

BACKGROUND

Current news information-like applications usually only have the following functions: pushing news content unidirectionally to a user in the form of voice broadcast; supporting voice control, for example, receiving simple control instructions such as "next item", "pause", "continue" or "switch a field" input by the user by voice to enable the switching of voice-broadcast news, the pause of the voice-broadcast news and so on. However, the current news information-like applications cannot meet user-raised relevant interaction demands for the currently-read news content, for example, the user's question for the current news content.

SUMMARY

A news interaction method, apparatus, device and computer storage medium are proposed. Input information input by a user upon reading current news content is obtained; parsing information of the input information is obtained based on the current news content, where the parsing information includes intent information of the input information; the input information is distributed to at least one news interactive service subsystem according to the intent information of the input information, and a return result returned by the at least one news interactive service subsystem is received; and a display result is selected from the return result according to a preset policy, and provided to the user.

DETAILED DESCRIPTION OF EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be understood that the term "and/or" used in the text is only an association relationship depicting associated objects and represents that three relations might exist, for example, A and/or B may represents three cases, namely, A exists individually, both A and B coexist, and B exists individually. In addition, the symbol "I" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "in response to determining" or "when . . . (stated condition or event) is detected" or "in response to detecting (stated condition or event)".

Figure 1:
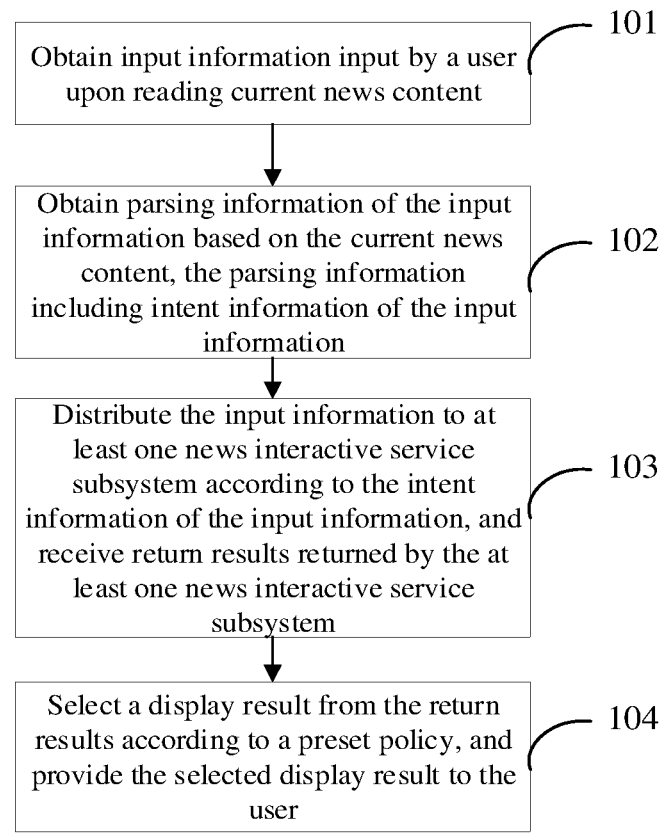
FIG. 1 is a flow chart of a news interaction method according to an embodiment of the present disclosure.

FIG. 1 is a flow chart of a news interaction method according to an embodiment of the present disclosure. As shown in FIG. 1, the method includes:

At 101, input information input by a user upon reading current news content is obtained.

In this step, the input information input by the user upon reading the current news content is obtained. In other words, the present disclosure is applied to a scenario in which a news information-like application displays news content to a user, for example, the news information-like application interacts with the user when displaying the news content to the user in a form of voice broadcast.

Specifically, the input information obtained in this step may be text information or voice information. If the obtained input information is voice information, this step also needs to convert the voice information into text information. It may be understood that after the input information input by the user is obtained, the obtained input information may be put on the screen in the form of text.

At 102, parsing information of the input information is obtained based on the current news content, and the parsing information includes intent information of the input information.

In this step, the input information obtained in step 101 is parsed based on the news content currently read by the user, thereby obtaining parsing information corresponding to the input information. The parsing information of the input information includes intent information of the input information, and may further include field information of the input information.

Specifically, the intent information of the input information is a type of news interactive service needed by the user when inputting the input information, such as news recommendation service, news question-answer service or news chat service; field information of the input information is a field to which the news needed by the user upon inputting the input information belongs, for example, news in the field of sports, news in the military field or news in the field of entertainment.

In this step, when the intent information of the input information is obtained based on the current news content, the intent of the user upon obtaining the current news content may be determined as the intent information of the input information, for example, the news content currently read by the user is obtained according to a question previously input by the user, and the news question-answer service is determined as the intent information of the input information.

In addition, in this step, when the intent information of the input information is obtained based on the current news content, the following manner may also be employed: obtaining respectively the intent of the user upon obtaining the current news content and the user's intent of the input information; if the user's intent of the input information cannot be obtained, determining the intent of the user upon obtaining the current news content as the intent information of the input information, otherwise determining the user's intent of the input information as the intent information of the input information. In this step, the user's intent may be obtained according to semantic information of the input information, and determining the user's intent of a text according to the semantic information of the text is known in prior art and will not be described in detail any more here.

Since the input information of the user is generally related to the current news content read by the user, it is possible in this step to directly determine the field to which the current news content belongs as the field information of the input information when obtaining the field information of the input information based on the current news content.

In addition, in this step, the following manner may be employed when the field information of the input information is obtained based on the current news content: respectively obtaining a field to which the current news content belongs and a field to which the input information belongs; if the two fields are the same or the field to which the input information belongs to cannot be obtained, determining the field to which the current news content belongs as the field information of the input information; if the two fields are different, determining the field to which the input information belong as the field information of the input information. Similarly, in this step, the field to which the news content belongs and the field to which the input information belongs may be obtained according to the news content or the semantic information of the input information, and determining the field to which a text belongs to according to the semantic information of the text is known in prior art and will not be described in detail any more here.

It is to be understand that, in this step, the following manner may also be employed when the parsing information of the input information is obtained based on the current news content: obtaining previous input information input by the user when obtaining the current news content, that is, input information input by the user before the current input information is obtained; parsing the input information based on the previous input information, and obtaining the parsing information corresponding to the input information. A process of obtaining the parsing information of the input information based on the previous input information is the same as the process of obtaining the parsing information of the input information based on the current news content, and is not described in detail any more herein. In this step, the input information is jointly parsed based on the currently read news content and the previous input information to obtain the parsing information of the input information.

Therefore, the method for obtaining the parsing information of the input information by the news content currently read by the user may make the obtained parsing information more conform to the news content currently read by the user, thereby achieving the purpose of obtaining a return result more in line with the user's actual needs.

At 103, the input information is distributed to at least one news interactive service subsystem according to the intent information of the input information, and the return result returned by the at least one news interactive service subsystem is received.

In this step, the input information is distributed to at least one news interactive service subsystem according to the intent information of the input information obtained in step 102, and then the return result returned by the at least one news interactive service subsystem is received. The news interactive service subsystem includes at least one of a news recommendation service subsystem, a news question-answer service subsystem, or a news chat service subsystem.

Therefore, processes of different news interactive service subsystems obtaining return results according to the input information will be described in three different parts.

1. The Process of the News Recommendation Service Subsystem Obtaining the Return Result.

If the obtained intent information of the input information is that the user needs news recommendation service, that is, the user wants to read other news content, the input information is sent to the news recommendation service subsystem, and then the return result returned by the news recommendation service subsystem is thereby obtained.

Specifically, the following manner may be employed when the news recommendation service subsystem obtains the return result according to the input information: obtaining field information of the input information; and obtaining news satisfying the field information of the input information from a news database, for example, obtaining news in "sports field" from the news database; selecting, from the obtained news, news satisfying the input information as candidate news, and taking the selected candidate news as the return result, for example, selecting, from the news in "sports field", candidate news satisfying "Premier League" in the user's input information and taking the candidate news as the return result.

It may be understood that when the news recommendation service subsystem obtains multiple return results at the same time, a preset number of return results may be randomly selected and returned to the user, for example, one return result is randomly selected and returned to the user; it is possible to perform personalized sorting for the multiple return results based on user's history, news popularity and a site to which the news belongs, and thereby select and return top N return results to the user, where N is a positive integer greater than or equal to 1. The present disclosure does not limit the number of return results and the method of sorting the return results.

2. The Process of the News Question-Answer Service Subsystem Obtaining the Return Result.

If the obtained intent information of the input information is that the user needs news question-answer service, that is, the user wants to obtain an answer corresponding to the input information, the input information is sent to the news question-answer service subsystem, and then the return result is returned by the news question-answer service subsystem.

In this embodiment, the news question-answer service subsystem includes at least one question-answer module of a text precise question-answer module, an event graph question-answer module and a question search question-answer module. After receiving the input information, the news question-answer service subsystem distributes the received input information to at least one question-answer module, and after screening answers returned by the at least one question-answer module, returns an answer obtained from the screening to the user as the return result.

(1) The text precise question-answer module may employ the following manner when obtaining the answer according to the input information:

obtaining the news content currently read by the user, considering the obtained news content and input information as an input of an answer generation model, and considering an output result of the answer generating model as the answer corresponding to the input information. The answer generating model used in the text precise question-answer module is obtained by pre-training. That is to say, the text precise question-answer module may directly take the input information as query information, and obtain, from the news content currently read by the user, an answer corresponding to the query information.

The answer generating model may be obtained by pre-training in the following manner: obtaining news content, a question corresponding to each news content and an answer corresponding to each question as training data, where the answer corresponding to each question in the training data exists in the corresponding news content; training a learning model by taking each news content and the question corresponding to each news content as input and taking the answer corresponding to the question as an output, to obtain the answer generating model. The answer generating model obtained by the training can obtain the answer corresponding to the query information from the news content according to the input news content and the query information.

(2) The event graph question-answer module may employ the following manner upon obtaining the answer according to the input information:

segmenting the input information into words, and taking a word with a preset part of speech in a word-segmenting result as query information, where the preset part of speech may be a noun and a pronoun; determining an event corresponding to the input information according to semantic information of the input information; according to an event graph, forming an answer corresponding to the input information with a node which is in the determined event and matched with the query information.

The event graph is generated in real time based on a large amount of news fetched from the Internet, so that the event graph may satisfy the user's need for question and answer of news content at a different time. The event graph includes a plurality of events, and each event includes a plurality of nodes. Therefore, it is possible to, after determining the event of the input information, query for a node matched with obtained query information from the event of the event graph, and thereby obtain the answer corresponding to the input information.

Since the event graphs in different fields might contain the same events, in order to further improve the accuracy of the answer acquisition, the event graphs may be classified according to fields to which they belong, for example, the event graphs are classified into "sports field" event graph, "military field" event graph, "entertainment field" event graph and so on. If the event graphs are classified according to the fields to which they belong, the event graph question-answer module, upon obtaining the answer, needs to determine the event graphs corresponding to fields according to the field information of the input information, and then match nodes in the determined event graphs corresponding to the fields to achieve the purpose of further improving the accuracy of the obtained answer.

For example, events such as "goal" event, "transfer" event may be pre-defined in the "sports field" event graph, where the "goal" event may include nodes such as "player's name", "team name", "match venue and round" and "goal time", and the "transfer" event may include nodes such as "player's name", "team name", "transfer fees" and "duration of the signed contract".

It may be understood that if the event graph question-answer module cannot obtain an answer according to the input information, this might be caused by the fact that the input information is relatively simple and the specific query information cannot be obtained. Therefore, the event graph question-answer module may further include the following content: obtaining news content, the obtained news content including at least one of news content currently read by the user and news content historically read by the user; according to the event determined by the input information, extracting information related to the event from the obtained news content to complement the query information; according to the event graph, forming an answer corresponding to the input information with a node which is in the determined event and matched with a complementation result.

For example, if the input information is "who makes the first goal?", the event graph question-answer module takes the "first ball" and "who" in the word-segmentation result as the query information, and knows that the input information belongs to a "goal" event according to the semantic information of the input information. However, since the query information does not include the match venue and round, the event graph question-answer module cannot obtain an accurate answer. The user usually performs the current question based on the news content being read, so the event graph question-answer module extracts related information, for example, "match venue and round", which is needed by the "goal" event and not included in the query information through the user-read news content. For example, if what is being read by the user is news content related to "Team A versus Team B in the tenth round of LaLiga", it is possible to add "Team A versus Team B in the tenth round of LaLiga" in the news content to the already-obtained query information, and thereby obtain the answer "the first goal in the match Team A versus Team B in the tenth round of LaLiga is made by player C".

(3) The following manner may be employed when the question search question-answer module obtains the answer according to the input information:

obtaining semantic information of the input information; determining a question which is in a question-answer pair database and matches the semantic information of the input information, for example, a question whose semantic similarity with the input information is larger than a preset threshold; taking an answer corresponding to the question obtained from search as the answer corresponding to the input information.

The question-answer database includes a large number of question-answer pairs. The question-answer pairs may be obtained in the following manner: fetching news from the Internet; inputting the fetched news into a question-answer pair generating model, and taking an output result of the question-answer pair generating model as a question-answer pair; storing the obtained question-answer pair in the question-answer pair database. The question-answer pair generating model is obtained by pre-training. The present disclosure does not limit the number of the question-answer pairs generated by the question-answer pair generating model.

The following manner may be employed to obtain the question-answer pair generating model by training: obtaining news and its corresponding question-answer pair; training a learning model by taking each news as input and taking the question-answer pair corresponding to each news as output to obtain the question-answer pair generating model. The question-answer pair generating model obtained by training may be used to generate a plurality of question-answer pairs corresponding to the input news according to the input news.

It may be understood that the news question-answer service subsystem might obtain a plurality of answers according to the input information. When the news question-answer service subsystem obtains the plurality of corresponding answers at the same time, it is possible to select an answer therefrom according to a confidence level preset by each question-answer module as a return result, for example, select, from the obtained answers, an answer obtained by a question-answer module with the highest preset confidence level, as a return result; in addition, since each question-answer module in the present disclosure can obtain an accurate answer, the news question-answer service subsystem may also randomly select a answer from a plurality of answers as the return result.

3. The Specific Process of the News Chat Service Subsystem Obtaining the Returned Result.

If the obtained intent information of the input information is that the user needs news chat service, that is, the user wants to obtain a chat reply corresponding to the input information, the input information is sent to the news chat service subsystem, and then the return result returned by the news chat service subsystem is obtained.

Specifically, the following manner may be employed when the news chat service subsystem obtains the return result according to the input information: obtaining the news content currently read by the user; obtaining a chat corpus corresponding to news content currently read by the user, for example, the chat corpus may be content such as user's comments, replies or forum posts corresponding to the news content currently read by the user; taking the obtained chat corpus and the input information as an input of a chat reply model, and taking an output result of the chat reply model as a return result corresponds to the input information. The chat reply model is obtained by pre-training.

The following manner may be employed when the chat reply model is trained: obtaining the chat corpus and its corresponding chat context information; training a learning model by taking the chat corpus and its corresponding chat context information as an input and taking the chat context information corresponding to each chat corpus as an output, to obtain the chat reply model. The chat reply model obtained by the training can be used to generate a response corresponding to the input information according to the input chat corpus and the input information.

At 104, a display result is selected from the return result according to a preset policy, and the display result obtained by selection is provided to the user.

In this step, if a plurality of return results returned by the at least one news service subsystem are received according to step 103, a display result is selected from a plurality of return results according to a preset policy, and the selected display result is provided to the user.

The preset policy may be randomly selecting a preset number of return results as the display result, for example, randomly selecting one return result as the display result; or the preset policy may be making a decision for the return result according to the user's historical input information to determine the display result. For example, if the user's current input information is related to the previous input information, and the intent information corresponding to the previous input information is a news question and answer, the return result obtained by the news question-answer service subsystem may be taken as the display result.

In this step, when the selected display result is provided to the user, only the obtained display result may be put on the screen in a text form; or the voice corresponding to the display result may be played when the display result in the text form is put on the screen.

It may be understood that in the present disclosure after the display result is provided to the user, if the input information input by the user is not received within a preset time, the news content may be automatically pushed to the user for reading by the user; or question information may be actively sent to the user to obtain the input information input by the user again, and then the display result is obtained according to the input information input by the user according to the above process and provided to the user.

Figure 2:
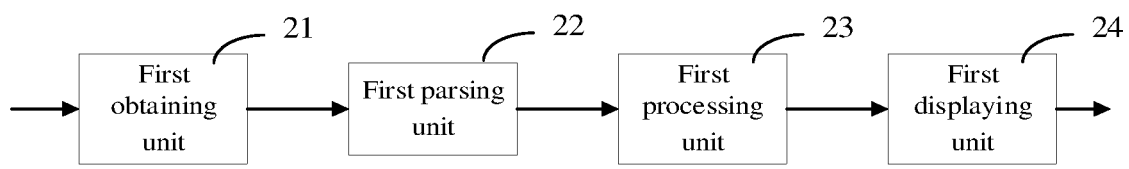
FIG. 2 is a block diagram of a news interaction apparatus according to an embodiment of the present disclosure.

FIG. 2 is a block diagram of a news interaction apparatus according to an embodiment of the present disclosure. As shown in FIG. 2, the apparatus includes: a first obtaining unit 21, a first parsing unit 22, a first processing unit 23 and a display unit 24.

The first obtaining unit 21 is configured to obtain input information input by the user upon reading the current news content.

The first obtaining unit 21 obtains input information input by the user upon reading the current news content.

Specifically, the input information obtained by the first obtaining unit 21 may be text information or voice information. If the obtained input information is voice information, the first obtaining unit 21 further needs to convert the voice information into text information. It may be understood that after the input information input by the user is obtained, the first obtaining unit 21 may put the obtained input information on the screen in the form of text.

The first parsing unit 22 is configured to obtain parsing information of the input information based on the current news content, the parsing information including intent information of the input information.

The first parsing unit 22 parses the input information obtained by the first obtaining unit 21 based on the news content currently read by the user, thereby obtaining parsing information corresponding to the input information. The parsing information of the input information includes intent information of the input information, and may further include field information of the input information.

Specifically, the intent information of the input information is a type of news interactive service needed by the user when inputting the input information, such as news recommendation service, news question-answer service or news chat service; field information of the input information is a field to which the news needed by the user upon inputting the input information belongs, for example, news in the field of sports, news in the military field or news in the field of entertainment.

When the intent information of the input information is obtained based on the current news content, the first parsing unit 22 may determine the intent of the user upon obtaining the current news content as the intent information of the input information.

In addition, the first parsing unit 22 may employ the following manner upon obtaining the intent information of the input information based on the current news content: respectively obtaining the intent of the user upon obtaining the current news content and the user's intent of the input information; if the user's intent of the input information is not obtained, the intent of the user upon obtaining the current news content is determined as the intent information of the input information, otherwise the user's intent of the input information is determined as the intent information of the input information.

Since the input information of the user is generally related to the current news content read by the user, the first parsing unit 22 directly determines the field to which the current news content belongs as the field information of the input information upon obtaining the field information of the input information based on the current news content.

In addition, the first parsing unit 22 may employ the following manner upon obtaining the field information of the input information based on the current news content: respectively obtaining a field to which the current news content belongs and a field to which the input information belongs; if the field to which the input information belongs cannot be obtained, determining the field to which the current news content belongs as the field information of the input information, otherwise determining the field to which the input information belongs as the field information of the input information.

It may be understood that the first parsing unit 22 may employ the following manner upon obtaining the parsing information of the input information based on the current news content: obtaining previous input information input by the user when obtaining the current news content, that is, input information input by the user before the current input information is obtained; parsing the input information based on the previous input information, and obtaining the parsing information corresponding to the input information.

The first parsing unit 22 may further jointly parse the input information based on the currently read news content and the previous input information to obtain the parsing information of the input information.

Therefore, the method of the first parsing unit 22 obtaining the parsing information of the input information by the news content currently read by the user can make the obtained parsing information more conform to the news content currently read by the user, thereby achieving the purpose of obtaining a return result more in line with the user's actual needs.

The first processing unit 23 is configured to distribute the input information to at least one news interactive service subsystem according to the intent information of the input information, and receive a return result returned by the at least one news interactive service subsystem.

The first processing unit 23 distributes the input information obtained by the first obtaining unit 21 to at least one news interactive service subsystem according to the intent information of the input information obtained by the first parsing unit 22, and then receive the return result returned by the at least one news interactive service subsystem. The news interactive service subsystem includes at least one of a news recommendation service subsystem, a news question-answer service subsystem, and a news chat service subsystem.

The first displaying unit 24 is configured to select a display result from the return results according to a preset policy, and display the display result obtained by selection to the user.

If the first processing unit 23 receives a plurality of return results returned by the at least one news service subsystem, the first displaying unit 24 selects a display result from a plurality of return results according to a preset policy, and displays the display result obtained by selection to the user.

The preset policy may be randomly selecting a preset number of return results as the display result, or may be making a decision for the return result according to the user's historical input information to determine the display result.

Upon providing the selected display result to the user, the first displaying unit 24 may only put the obtained display result on the screen in a text form; or the first displaying unit 24 may play the voice corresponding to the display result while putting the display result in the text form on the screen.

It may be understood that after providing the display result to the user, the first displaying unit 24 may perform the following operations: if the input information input by the user is not received within a preset time, the first displaying unit 24 may automatically push the news content to the user for reading by the user; the first displaying unit 24 may also send question information actively to the user to obtain the input information input by the user again, and then obtain the display result according to the input information input by the user according to the above process and provide the display result to the user.

Figure 3:
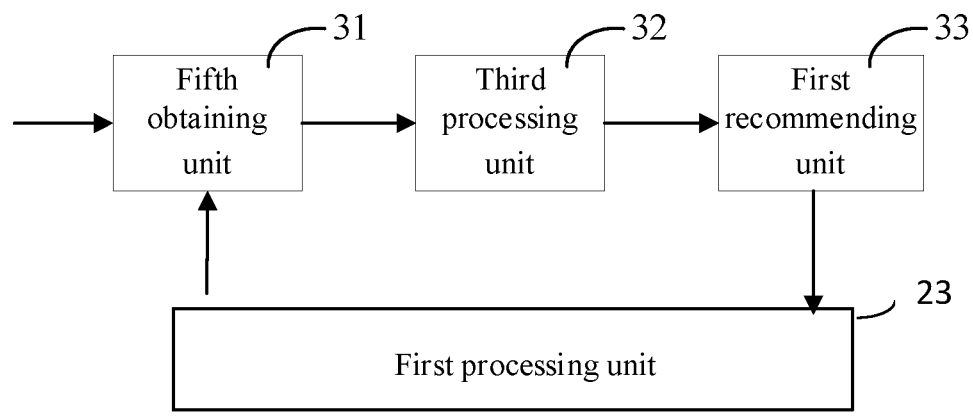
FIG. 3 is a block diagram of a device of a news recommendation service subsystem according to an embodiment of the present disclosure.

FIG. 3 is a block diagram of a device of a news recommendation service subsystem according to an embodiment of the present disclosure. As show in FIG. 3, the device includes: a fifth obtaining unit 31, a third processing unit 32 and a first recommending unit 33.

If the intent information of the input information obtained by the first parsing unit 22 is that the user needs the news recommendation service, the first processing unit 23 sends the input information to the news recommendation service subsystem, and then obtains a return result returned by the news recommendation service subsystem.

The news recommendation service subsystem specifically includes:

the fifth obtaining unit 31 configured to obtain field information of the input information; the third processing unit 32 configured to obtain news satisfying the field information of the input information from a news database; the first recommending unit 33 configured to select, from the obtained news, news satisfying the input information as candidate news, and take the selected candidate news as the return result, and return it to the first processing unit 23.

It may be understood that when the first recommending unit 33 of the news recommendation service subsystem obtains multiple return results at the same time, a preset number of return results may be randomly selected and returned to the first processing unit 23; it is possible to perform personalized sorting for the multiple return results based on user's history, news popularity and a site to which the news belongs, and thereby select and return top N return results to the first processing unit 23, where N is a positive integer greater than or equal to 1. The present disclosure does not limit the number of return results and the method of sorting the return results.

Figure 4:
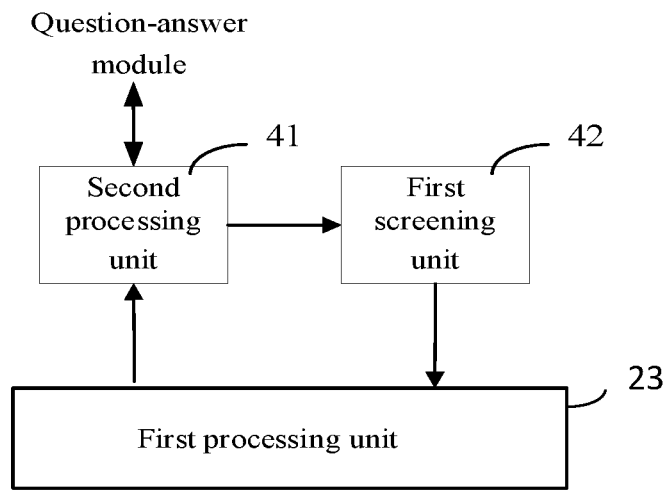
FIG. 4 is a block diagram of a device of a news question-answer service subsystem according to an embodiment of the present disclosure.

FIG. 4 is a block diagram of a device of a news question-answer service subsystem according to an embodiment of the present disclosure. As shown in FIG. 4, the device includes: a second processing unit 41 and a first screening unit 42.

If the intent information of the input information obtained by the first parsing unit 22 is the news question-answer service needed by the user, the first processing unit 23 sends the input information to the news question-answer service subsystem, and then obtains the return result returned by the news question-answer service subsystem.

The news question-answer service subsystem specifically includes:

the second processing unit 41 configured to distribute the input information to at least one question-answer module, and receive an answer returned by the at least one question-answer module.

the first screening unit 42 configured to screen returned answers and return an answer obtained from the screening to the first processing unit 23.

It may be understood that the second processing unit 41 might obtain a plurality of answers according to the input information. The first screening unit 42 may employ the following manner upon screening the returned answers: according to a confidence level preset for each question-answer module, the first screening unit 42 selects an answer obtained by a question-answer module with the highest confidence level, as a return result; the first screening unit 42 may further select one answer from a plurality of answers as the return result.

The news question-answer service subsystem includes at least one question-answer of a text premise question-answer module, an event graph question-answer module and a question search question-answer module. Structural diagrams of the devices of the three question-answer modules will be described respectively below.

Figure 5:
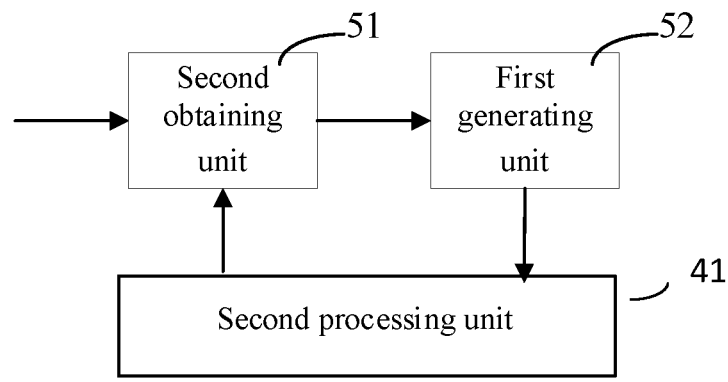
FIG. 5 is a block diagram of a device of a text precise question-answer module according to an embodiment of the present disclosure.

FIG. 5 is a block diagram of a device of a text precise question-answer module according to an embodiment of the present disclosure. As shown in FIG. 5, the device includes: a second obtaining unit 51 and a first generating unit 52.

The second obtaining unit 51 is configured to obtain news content currently read by the user.

The first generating unit 52 is configured to take the obtained news content and input information as an input of an answer generating model, take an output result of the answer generating model as an answer corresponding to the input information, and return it to the second processing unit 41.

The answer generating model used in the first generating unit 52 is obtained by pre-training.

The first generating unit 52 may obtain the answer generating module by pre-training in the following manner: obtaining news content, a question corresponding to each news content and an answer corresponding to each question as training data, where the answer corresponding to each question in the training data exists in the corresponding news content; training a learning model by taking each news content and the question corresponding to each news content as an input and taking the answer corresponding to the question as an output, to obtain the answer generating model. The answer generating model obtained by the training can obtain the answer corresponding to the query information from the news content according to the input news content and the query information.

Figure 6:
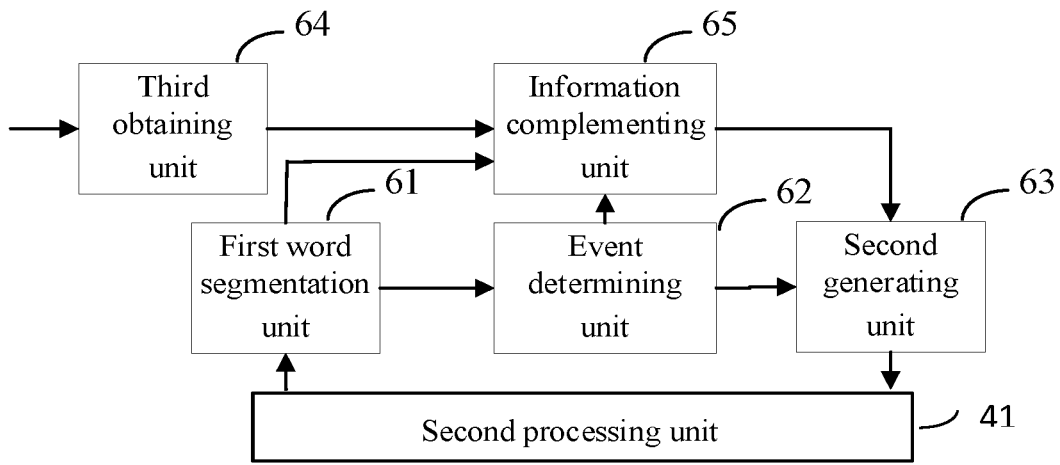
FIG. 6 is a block diagram of a device of an event graph question-answer module according to an embodiment of the present disclosure.

FIG. 6 is a block diagram of a device of an event graph question-answer module according to an embodiment of the present disclosure. As shown in FIG. 6, the device includes: a first word segmentation unit 61, an event determining unit 62, a second generating unit 63, a third obtaining unit 64 and an information complementing unit 65.

The first word segmentation unit 61 is configured to perform word segmentation for the input information, and take words with a preset part of speech in a word segmentation result as the query information, where the preset part of speech may be noun and pronoun.

The event determining unit 62 is configured to determine an event corresponding to the input information according to semantic information of the input information.

The second generating unit 63 is configured to, according to the event graph, form an answer corresponding to the input information with a node which is in the determined event and matched with the query information.

The event graph used by the second generating unit 63 is generated in real time based on a large amount of news fetched from the Internet, so that the event graph may satisfy the user's need for question and answer of news content at a different time. The event graph includes a plurality of events, and each event includes a plurality of nodes. Therefore, after the event determining unit 62 determines the event of the input information, the second generating unit 63 can query for a node matched with obtained query information from the events of the event graph, and thereby obtain the answer corresponding to the input information.

Since the event graphs in different fields might contain the same events, in order to further improve the accuracy of the answer acquisition, the event graphs may be classified according to fields to which they belong. If the event graphs are classified according to the fields to which they belong, the event determining unit 62 further needs to obtain the field information of the input information to determine the event graph corresponding to the field, and then determine the event in the event graph of the determined field, thereby achieving the purpose of further improving the accuracy of the obtained answer.

It may be understood that if the second generating unit 63 cannot obtain an answer according to the input information, this might be caused by the fact that the input information is relatively simple and the specific query information cannot be obtained. Therefore, the event graph question-answer module may further include the following means:

the third obtaining unit 64 configured to obtain news content, the obtained news content including at least one of news content currently read by the user and news content historically read by the user.

the information complementing unit 65 configured to, according to the event determined by the input information, extract information related to the event from the obtained news content to complement the query information.

the second generating unit 63 configured to, according to the event graph, form the answer corresponding to the input information with a node which is in the determined event and matched with a complementation result obtained by the information complementing unit 65, and return it to the second processing unit 41.

Figure 7:
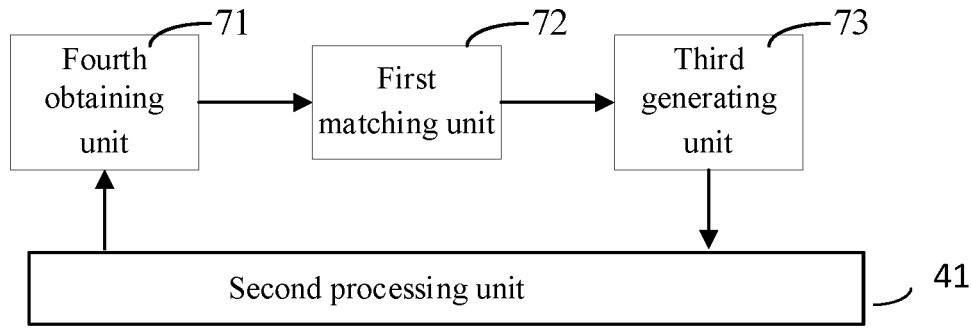
FIG. 7 is a block diagram of a device of a question search question-answer module according to an embodiment of the present disclosure.

FIG. 7 is a block diagram of a device of a question search question-answer module according to an embodiment of the present disclosure. As shown in FIG. 7, the device includes: a fourth obtaining unit 71, a first matching unit 72 and a third generating unit 73.

The fourth obtaining unit 71 is configured to obtain semantic information of the input information.

The first matching unit 72 is configured to determine question which is in a question-answer pair database and matches the semantic information of the input information.

The third generating unit 73 is configured to take an answer which is in the question-answer database and corresponds to the determined question as an answer corresponding to the input information, and return it to the second processing unit 41.

The question-answer database includes a large number of question-answer pairs. The question-answer pairs may be obtained in the following manner: fetching news from the network; inputting the fetched news into a question-and-answer pair generating model, and taking an output result of the question-answer pair generating model as a question-answer pair; storing the obtained question-answer pair in the question-answer pair database. The question-answer pair generating model is obtained by pre-training. The present disclosure does not limit the number of the question-answer pairs generated by the question-answer pair generating model.

The following manner may be employed to obtain the question-answer pair generating model by training: obtaining news and its corresponding question-answer pair; training a learning model by taking each news as an input and taking the question-answer pair corresponding to each news as an output to obtain the question-answer pair generating model. The question-answer pair generating model obtained by training may be used to generate a plurality of question-answer pairs corresponding to the input news according to the input news.

Figure 8:
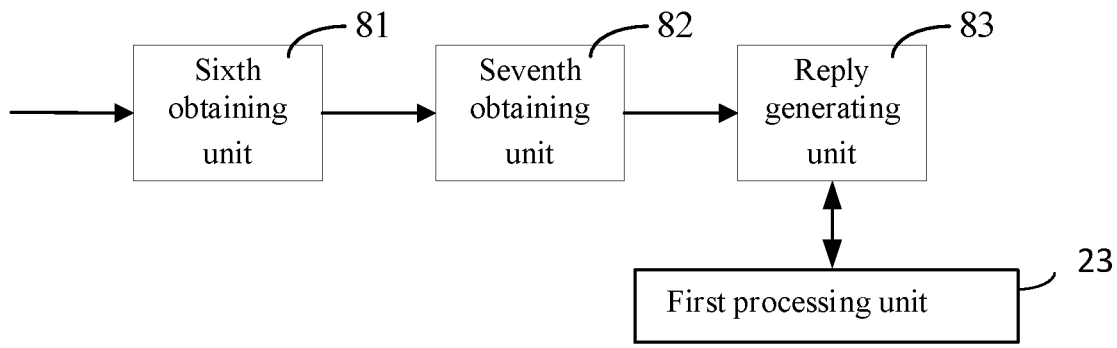
FIG. 8 is a block diagram of a device of a news chat service subsystem according to an embodiment of the present disclosure.

FIG. 8 is a block diagram of a device of a news chat service subsystem according to an embodiment of the present disclosure. As shown in FIG. 8, the device includes: a sixth obtaining unit 81, a seventh obtaining unit 82 and a reply generating unit 83.

If the intent information of the input information obtained by the first parsing unit 22 is that the user needs news chat service, the first processing unit 23 sends the input information to the news chat service subsystem, and then obtain the return result returned by the news chat service subsystem.

The news chat service subsystem specifically includes:
The sixth obtaining unit 81 configured to obtain the news content currently read by the user.

The seventh obtaining unit 82 is configured to obtain a chat corpus corresponding to news content currently read by the user. The chat corpus may be at least one of the user's comments and forum posts corresponding to the news content currently read by the user.

The reply generating unit 83 is configured to take the obtained chat corpus and input information as input of a chat reply model, take an output result of the chat reply model as a return result corresponds to the input information, and return it to the first processing unit 23.

The chat reply model used in the reply generating unit 83 is obtained by pre-training. The reply generating unit 83 may generate the following manner upon training the chat reply model: obtaining the chat corpus and its corresponding chat context information; training a learning model by taking each chat corpus and its corresponding chat context information as an input and taking the chat context information corresponding to each chat corpus as an output, to obtain the chat reply model. The chat reply model obtained by the training may be used to generate a response corresponding to the input information according to the input chat corpus and the input information.

Figure 9:
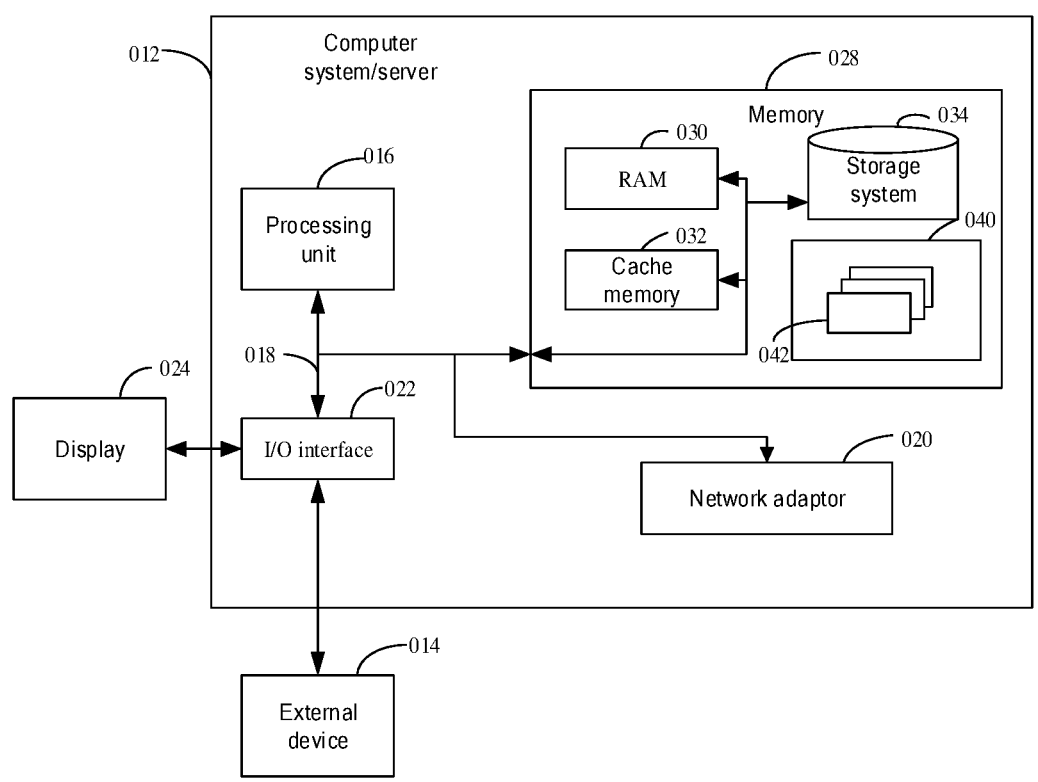
FIG. 9 is a block diagram of a computer system/server according to an embodiment of the present disclosure.

FIG. 9 illustrates a block diagram of an example computer system/server 012 adapted to implement an implementation mode of the present disclosure. The computer system/server 012 shown in FIG. 9 is only an example and should not bring about any limitation to the function and scope of use of the embodiments of the present disclosure.

As shown in FIG. 9, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 may include computer system readable media in the form of volatile memory, such as random access memory (RAM) 030 and/or cache memory 032.

Computer system/server 012 may further include other removable/non-removable, volatile/non-volatile computer system storage media. By way of example only, storage system 034 may be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication may occur via Input/Output (I/O) interfaces 022. Still yet, computer system/server 012 may communicate with one or more networks such as a local area network (LAN), a general wide area network (WAN), and/or a public network (e.g., the Internet) via network adapter 020. As depicted in FIG. 9, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement the flow of the method provided by embodiments of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the flow of the method provided by the embodiments of the present disclosure is performed by the one or more processors.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electro-magnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

According to technical solutions according to the present disclosure, it is possible to parse the input information input by the user through the news content currently read by the user, distribute the input information to a plurality of news service subsystems, and then obtain the return results returned by the news service subsystem, enrich the interaction function of the current news application, satisfy the user's diverse interaction demands, and achieve provision of more diverse return results to the user.

In the embodiments provided by the present disclosure, it should be understood that the revealed system, apparatus and method may be implemented in other ways. For example, the above-described embodiments for the apparatus are only exemplary, e.g., the division of the units is merely logical one, and, in reality, they may be divided in other ways upon implementation.

The units described as separate parts may be or may not be physically separated, the parts shown as units may be or may not be physical units, i.e., they may be located in one place, or distributed in a plurality of network units. One may select some or all the units to achieve the purpose of the embodiment according to the actual needs.

Further, in the embodiments of the present disclosure, functional units may be integrated in one processing unit, or they may be separate physical presences; or two or more units may be integrated in one unit. The integrated unit described above may be implemented in the form of hardware, or they may be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

In view of the above, embodiments of the present disclosure provides a news interaction method, apparatus, device and computer storage medium, for enriching interaction functions of the current news applications, satisfying the user's diverse interaction demands, and achieving provision of more diverse return results to the user.

According to an embodiment of the present disclosure, a news interaction method is proposed. The method includes: obtaining input information input by a user upon reading current news content; obtaining parsing information of the input information based on the current news content, where the parsing information includes intent information of the input information; distributing the input information to at least one news interactive service subsystem according to the intent information of the input information, and receiving a return result returned by the at least one news interactive service subsystem; and selecting a display result from the return results according to a preset policy, and providing the display result obtained by selection to the user.

According to an embodiment of the present disclosure, obtaining the intent information of the input information based on the current news content may include: obtaining respectively the intent of the user upon obtaining the current news content and the user's intent of the input information; if the user's intent of the input information cannot be obtained, determining the intent of the user upon obtaining the current news content as the intent information of the input information, and if the user's intent of the input information is obtained, determining the user's intent of the input information as the intent information of the input information.

According to an embodiment of the present disclosure, the parsing information of the input information may further include field information of the input information, and obtaining the field information of the input information based on the current news content include: obtaining respectively a field to which the current news content belongs and a field to which the input information belongs; if the field to which the input information belongs cannot be obtained, determining the field to which the current news content belongs as the field information of the input information, and if the field to which the input information belongs is obtained, determining the field to which the input information belongs as the field information of the input information.

According to an embodiment of the present disclosure, obtaining parsing information of the input information based on the current news content may include: obtaining previous input information input by the user when obtaining the current news content; and parsing the input information based on the previous input information, and obtaining the parsing information of the input information.

According to an embodiment of the present disclosure, the news interactive service subsystem includes at least one of a news recommendation service subsystem, a news question-answer service subsystem and a news chat service subsystem.

According to an embodiment of the present disclosure, the news question-answer service subsystem includes at least one question-answer module of a text precise question-answer module, an event graph question-answer module and a question search question-answer module; the news question-answer service subsystem distributes the input information to the at least one question-answer module, and receives answers returned by the at least one question-answer module; screens the returned answers and takes an answer obtained from the screening as the return result.

According to an embodiment of the present disclosure, the method may further include: the text precise question-answer module obtains news content currently read by the user; takes the news content and the input information as an input for an answer generating model, and takes an output result of the answer generating model as an answer for the input information; where the answer generating model is obtained by pre-training.

According to an embodiment of the present disclosure, the method may further include: the event graph question-answer module performing word segmentation for the input information, and taking a word with a preset part of speech in a word segmentation result as query information; obtaining semantic information of the input information, and determining an event corresponding to the input information according to semantic information; according to an event graph, forming an answer for the input information with a node which is in the determined event and matched with the query information.

According to an embodiment of the present disclosure, the method may further include: the event graph question-answer module obtaining news content, the news content obtained includes at least one of news content currently read by the user and news content historically read by the user; according to an event corresponding to the input information, extracting information related to the event from the news content to complement the query information; and according to the event graph, forming the answer for the input information with a node which is in the event and matched with a complementation result.

According to an embodiment of the present disclosure, the method may further include: the question search question-answer module obtaining semantic information of the input information; determining a question which is in a question-answer pair database and matches the semantic information of the input information; taking an answer which is in the question-answer database and corresponds to the determined question as an answer corresponding to the input information; where the question-answer database includes a plurality of question-answer pairs.

According to an embodiment of the present disclosure, the question-answer pairs in the question-answer database are obtained by: fetching news from a network; inputting the fetched news into a question-and-answer pair generating model, and taking an output result of the question-answer pair generating model as a question-answer pair; and storing the question-answer pair obtained in the question-answer pair database; where the question-answer pair generating model is obtained by pre-training.

According to an embodiment of the present disclosure, the screening answers returned by the at least one of the text precise question-answer module, the event graph question-answer module and the question search question-answer module may include: selecting randomly an answer from a plurality of the answers as the return result; or according to a confidence level preset for each of the text precise question-answer module, the event graph question-answer module and the question search question-answer module, taking an answer obtained by one of the text precise question-answer module, the event graph question-answer module and the question search with the highest confidence level as the return result.

According to an embodiment of the present disclosure, the method further includes: the news recommendation service subsystem obtaining field information of the input information; obtaining news satisfying the field information from a news database; selecting, from the news obtained, news satisfying the input information as candidate news, and taking the candidate news as the return results.

According to an embodiment of the present disclosure, the method may further include: the news chat service subsystem obtaining news content currently read by the user; obtaining a chat corpus corresponding to the news content currently read by the user, the chat corpus including at least one of user's comments and forum posts corresponding to the news content currently read by the user; taking the chat corpus and the input information as an input of a chat reply model, and taking an output result of the chat reply model as the return result for the input information; where the chat reply model is obtained by pre-training.

According to an embodiment of the present disclosure, the selecting a display result from the return results according to a preset policy may include: selecting randomly a preset number of return results as the display result; or making a decision for the return results according to the user's historical input information to determine the display results.

According to an embodiment of the present disclosure, after providing the display result obtained by selection to the user, the method further includes: if input information input by the user is not received within a preset time, pushing news content to the user; or if input information input by the user is not received within a preset time, sending question information to the user to obtain input information input by the user.

According to an embodiment of the present disclosure, a news interaction apparatus is proposed. The apparatus includes: a first obtaining unit configured to obtain input information input by a user upon reading current news content; a first parsing unit configured to obtain parsing information of the input information based on the current news content, the parsing information including intent information of the input information; a first processing unit configured to distribute the input information to at least one news interactive service subsystem according to the intent information of the input information, and receive return results returned by the at least one news interactive service subsystem; and a first displaying unit configured to select a display result from the return results according to a preset policy, and provide the display result obtained by selection to the user.

According to an embodiment of the present disclosure, upon obtaining the intent information of the input information based on the current news content, the parsing unit specifically performs: obtaining respectively the intent of the user upon obtaining the current news content and the user's intent of the input information; if the user's intent of the input information cannot be obtained, determining the intent of the user upon obtaining the current news content as the intent information of the input information, and if the user's intent of the input information is obtained, determining the user's intent of the input information as the intent information of the input information.

According to an embodiment of the present disclosure, upon obtaining parsing information of the input information based on the current news content, the parsing unit specifically performs: obtaining previous input information input by the user when obtaining the current news content; and parsing the input information based on the previous input information, and obtaining the parsing information of the input information.

According to an embodiment of the present disclosure, the news interactive service subsystem includes at least one of a news recommendation service subsystem, a news question-answer service subsystem and a news chat service subsystem.

According to an embodiment of the present disclosure, the news question-answer service subsystem includes at least one of a text precise question-answer module, an event graph question-answer module and a question search question-answer module; the news question-answer service subsystem specifically includes: a second processing unit configured to distribute the input information to at least one of the text precise question-answer module, the event graph question-answer module and the question search question-answer module, and receive an answer returned by the at least one of the text precise question-answer module, the event graph question-answer module and the question search question-answer module; a first screening unit configured to screen the returned answers, and return an answer obtained from the screening to the first processing unit as the return result.

According to an embodiment of the present disclosure, the text precise question-answer module may include: a second obtaining unit configured to obtain the news content currently read by the user; a first generating unit configured to take the news content and the input information as an input for an answer generating model, take an output result of the answer generating model as an answer for the input information, and return it to the second processing unit; where the answer generating model is obtained by pre-training.

According to an embodiment of the present disclosure, the event graph question-answer module may include: a first word segmentation unit configured to perform word segmentation for the input information, and take a word with a preset part of speech in a word segmentation result as query information; an event determining unit configured to obtain semantic information of the input information, and determine an event corresponding to the input information according to the semantic information; a second generating unit configured to, according to an event graph, form the answer for the input information with a node which is in the determined event and matched with the query information, and return it to the second processing unit.

According to an embodiment of the present disclosure, the event graph question-answer module may further include: a third obtaining unit configured to obtain the news content, where the news content obtained includes at least one of news content currently read by the user and news content historically read by the user; an information complementing unit configured to, according to an event corresponding to the input information, extract information related to the event from the news content to complement the query information; the second generating unit configured to, according to the event graph, form the answer for the input information with a node which is in the event and matched with a complementation result, and return it to the second processing unit.

According to an embodiment of the present disclosure, the question search question-answer module may include: a fourth obtaining unit configured to obtain semantic information of the input information; a first matching unit configured to determine a question matched with the semantic information of the input information; a third generating unit configured to take an answer which is in a question-answer database and corresponds to the determined question as an answer of the input information, and return it to the second processing unit; where the question-answer database includes a plurality of question-answer pairs.

According to an embodiment of the present disclosure, upon screening answers returned by the at least one question-answer module, the first screening unit specifically performs: selecting randomly an answer from a plurality of the answers as the return result; or according to a confidence level preset by each of the text precise question-answer module, the event graph question-answer module and the question search question-answer module, take an answer obtained by one of the text precise question-answer module, the event graph question-answer module and the question search a question-answer module with the highest confidence level as the return result.

According to an embodiment of the present disclosure, the new recommendation service subsystem may include: a fifth obtaining unit configured to obtain field information of the input information; a third processing unit configured to obtain news satisfying the field information from a news database; a first recommending unit configured to select, from the news obtained, news satisfying the input information as candidate news, and return the candidate news to the first processing unit as the return results.

According to an embodiment of the present disclosure, the news chat service subsystem may include: a sixth obtaining unit configured to obtain news content currently read by the user; a seventh obtaining unit configured to obtain a chat corpus corresponding to news content currently read by the user, the chat corpus including at least one of the user's comments and forum posts corresponding to the news content currently read by the user; a reply generating unit configured to take the chat corpus and the input information as an input of a chat reply model, and take an output result of the chat reply model as the return result of the input information, and return it to the first processing unit; where the chat reply model is obtained by pre-training.

According to an embodiment of the present disclosure, upon selecting a display result from the return results according to a preset policy, the first display unit specifically performs: selecting randomly a preset number of return results as the display result; or making a decision for the return result according to user's historical input information to determine the display result.

According to an embodiment of the present disclosure, after providing the selected display results to the user, the first displaying unit further performs: if the input information input by the user is not received within a preset time, pushing the news content to the user; and if the input information input by the user is not received within a preset time, sending question information to the user to obtain the input information input by the user.

As may be seen from the above technical solutions, it is possible to parse the input information input by the user through the news content currently read by the user, distribute the input information to a plurality of news service subsystems, and then obtain a return result returned by the news service subsystem, enrich the interaction function of the current news application, satisfy the user's diverse interaction demands, and achieve provision of more diverse return results to the user.

What are stated above are only exemplary embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A news interaction method, comprising:
obtaining input information input by a user upon reading current news content;
obtaining parsing information of the input information based on the current news content, wherein the parsing information includes intent information of the input information;
distributing the input information to at least one news interactive service subsystem according to the intent information of the input information, and receiving a return result returned by the at least one news interactive service subsystem; and
selecting a display result from the return result according to a preset policy, and providing the display result obtained by selection to the user,
wherein the news interactive service subsystem comprises a news chat service subsystem,
wherein the method further comprises the following processing implemented by the news chat service subsystem:
obtaining news content currently read by the user;
obtaining a chat corpus corresponding to the news content currently read by the user, wherein the chat corpus includes at least one of user's comments or forum posts corresponding to the news content currently read by the user;
taking the chat corpus and the input information as an input of a chat reply model, and taking an output result of the chat reply model as the return result for the input information, and
wherein the chat reply model is obtained by pre-training with the chat corpus and its corresponding chat context information as an input and with the chat context information corresponding to each chat corpus as an output.

2. The method according to claim 1, wherein obtaining the intent information of the input information based on the current news content comprises:
obtaining respectively intent of the user upon obtaining the current news content and user's intent of the input information;
if the user's intent of the input information cannot be obtained, determining the intent of the user upon obtaining the current news content as the intent information of the input information, and if the user's intent of the input information is obtained, determining the user's intent of the input information as the intent information of the input information.

3. The method according to claim 1, wherein the parsing information of the input information further comprises:
field information of the input information, and
wherein obtaining the field information of the input information based on the current news content comprises:
obtaining respectively a field to which the current news content belongs and a field to which the input information belongs;
if the field to which the input information belongs cannot be obtained, determining the field to which the current news content belongs as the field information of the input information, and if the field to which the input information belongs is obtained, determining the field to which the input information belongs as the field information of the input information.

4. The method according to claim 1, wherein obtaining parsing information of the input information based on the current news content comprises:
obtaining previous input information input by the user when obtaining the current news content; and
parsing the input information based on the previous input information, and obtaining the parsing information of the input information.

5. The method according to claim 1, wherein the news interactive service subsystem further comprises at least one of: a news recommendation service subsystem or a news question-answer service subsystem.

6. The method according to claim 5, further comprising the following processing implemented by
the news question-answer service subsystem:
distributing the input information to at least one question-answer module of a text precise question-answer module, an event graph question-answer module, or a question search question-answer module;
receiving answers returned by the at least one question-answer module;
screening the returned answers; and
taking an answer obtained from the screening as the return result.

7. The method according to claim 6, further comprising the following processing implemented by the text precise question-answer module:
obtaining news content currently read by the user;
taking the news content and the input information as an input for an answer generating model; and
taking an output result of the answer generating model as an answer for the input information,
wherein the answer generating model is obtained by pre-training.

8. The method according to claim 6, further comprising the following processing implemented by the event graph question-answer module:
performing word segmentation for the input information, and taking a word with a preset part of speech in a word segmentation result as query information;
obtaining semantic information of the input information, and determining an event corresponding to the input information according to the semantic information;
according to an event graph, forming an answer for the input information with a node which is in the determined event and matched with the query information.

9. The method according to claim 8, further comprising the following processing implemented by the event graph question-answer module:
obtaining news content, wherein the news content obtained includes at least one of: news content currently read by the user, or news content historically read by the user;
according to an event corresponding to the input information, extracting information related to the event from the news content to complement the query information; and
according to the event graph, forming an answer for the input information with a node which is in the event and matched with a complementation result.

10. The method according to claim 6, further comprising the following processing implemented by the question search question-answer module:
obtaining semantic information of the input information;
determining a question which is in a question-answer pair database and matches the semantic information of the input information; and
taking an answer which is in the question-answer database and corresponds to the determined question as an answer corresponding to the input information,
wherein the question-answer database includes a plurality of question-answer pairs.

11. The method according to claim 10, wherein the question-answer pairs in the question-answer database are obtained by:
fetching news from a network;
inputting the fetched news into a question-answer pair generating model, and taking an output result of the question-answer pair generating model as a question-answer pair; and
storing the question-answer pair obtained in the question-answer pair database,
wherein the question-answer pair generating model is obtained by pre-training.

12. The method according to claim 6, wherein screening answers returned by the at least one question-answer module comprises one of:
selecting randomly an answer from a plurality of the answers as the return result; or
according to a confidence level preset for each of the text precise question-answer module, the event graph question-answer module or the question search question-answer module, taking an answer obtained by one of the text precise question-answer module, the event graph question-answer module or the question search with the highest confidence level as the return result.

13. The method according to claim 5, further comprising the following processing implemented by the news recommendation service subsystem:
obtaining field information of the input information;
obtaining news satisfying the field information from a news database; and
selecting, from the news obtained, news satisfying the input information as candidate news, and taking the candidate news as the return result.

14. The method according to claim 1, wherein selecting a display result from the return result according to a preset policy comprises one of:
selecting randomly a preset number of return results as the display result; or
making a decision for the return result according to user's historical input information to determine the display result.

15. The method according to claim 1, wherein after providing the display result obtained by selection to the user, the method further comprises:
if input information input by the user is not received within a preset time, pushing news content to the user; or
if input information input by the user is not received within a preset time, sending question information to the user to obtain input information input by the user.

16. A device, comprising:
one or more processors;
a storage for storing one or more programs,
said one or more programs are executed by said one or more processors to enable said one or more processors to implement a news interaction method, wherein the method comprises:
obtaining input information input by a user upon reading current news content;
obtaining parsing information of the input information based on the current news content, wherein the parsing information includes intent information of the input information;
distributing the input information to at least one news interactive service subsystem according to the intent information of the input information, and receiving a return result returned by the at least one news interactive service subsystem; and
selecting a display result from the return result according to a preset policy, and providing the display result obtained by selection to the user, wherein the news interactive service subsystem comprises a news chat service subsystem,
wherein the method further comprises the following processing implemented by the news chat service subsystem:
obtaining news content currently read by the user;
obtaining a chat corpus corresponding to the news content currently read by the user, wherein the chat corpus includes at least one of user's comments or forum posts corresponding to the news content currently read by the user;
taking the chat corpus and the input information as an input of a chat reply model, and taking an output result of the chat reply model as the return result for the input information, and
wherein the chat reply model is obtained by pre-training with the chat corpus and its corresponding chat context information as an input and with the chat context information corresponding to each chat corpus as an output.

17. A non-transitory storage medium comprising computer-executable instructions, the computer-executable instructions, when executed by a computer processor, being used to implement the method according to a news interaction method, wherein the method comprises:
obtaining input information input by a user upon reading current news content;
obtaining parsing information of the input information based on the current news content, wherein the parsing information includes intent information of the input information;
distributing the input information to at least one news interactive service subsystem according to the intent information of the input information, and receiving a return result returned by the at least one news interactive service subsystem; and
selecting a display result from the return result according to a preset policy, and providing the display result obtained by selection to the user,
wherein the news interactive service subsystem comprises a news chat service subsystem,
wherein the method further comprises the following processing implemented by the news chat service subsystem:
obtaining news content currently read by the user;
obtaining a chat corpus corresponding to the news content currently read by the user, wherein the chat corpus includes at least one of user's comments or forum posts corresponding to the news content currently read by the user;
taking the chat corpus and the input information as an input of a chat reply model, and taking an output result of the chat reply model as the return result for the input information, and
wherein the chat reply model is obtained by pre-training with the chat corpus and its corresponding chat context information as an input and with the chat context information corresponding to each chat corpus as an output.

\* \* \* \* \*